(12) United States Patent
Kukita

(10) Patent No.: US 9,630,561 B2
(45) Date of Patent: Apr. 25, 2017

(54) ELECTROCHROMIC MIRROR

(71) Applicant: KABUSHIKI KAISHA HONDA LOCK, Miyazaki-shi, Miyazaki (JP)

(72) Inventor: Tomoyuki Kukita, Miyazaki (JP)

(73) Assignee: KABUSHIKI KAISHA HONDA LOCK, Miyazaki (JP)

( * ) Notice: Subject to any disclaimer, the term of this patent is extended or adjusted under 35 U.S.C. 154(b) by 0 days.

(21) Appl. No.: 14/435,908

(22) PCT Filed: Jul. 4, 2013

(86) PCT No.: PCT/JP2013/068412
§ 371 (c)(1),
(2) Date: Apr. 15, 2015

(87) PCT Pub. No.: WO2014/061316
PCT Pub. Date: Apr. 24, 2014

(65) Prior Publication Data
US 2015/0251604 A1 Sep. 10, 2015

(30) Foreign Application Priority Data
Oct. 18, 2012 (JP) .................................. 2012-230765

(51) Int. Cl.
*G02F 1/155* (2006.01)
*B60R 1/08* (2006.01)
(Continued)

(52) U.S. Cl.
CPC ........ *B60R 1/088* (2013.01); *G02F 1/133553* (2013.01); *G02F 1/155* (2013.01); *G02F 1/157* (2013.01); *G02F 2001/1555* (2013.01)

(58) Field of Classification Search
CPC ............ G02F 1/157; G02F 1/155; B60R 1/88
(Continued)

(56) References Cited

U.S. PATENT DOCUMENTS 7,706,046 B2 *  4/2010  Bauer ..................... B60R 1/088
                                                            359/265
8,284,472 B2 * 10/2012  Yoshimura .......... G02F 1/13454
                                                            359/267
(Continued)

FOREIGN PATENT DOCUMENTS

EP        1437619       7/2004
JP        01172029      12/1989
(Continued)

OTHER PUBLICATIONS

International Search Report dated Aug. 27, 2013 filed in PCT/JP2013/068412.

*Primary Examiner* — Tuyen Tra
(74) *Attorney, Agent, or Firm* — Rankin, Hill & Clark LLP

(57) ABSTRACT

There is provided an electrochromic (EC) mirror that ensures the insulating properties between electrodes. A transparent electrode film (22), an EC layer (30) that emits a color light upon application of a voltage, and a reflecting electrode film (26) are sequentially laminated on a +X surface of a transparent substrate (21). A protruding portion (22*e*) of the transparent electrode film (22) is formed on a +Z side of the EC layer (30), and a protruding portion (26*e*) of the reflecting electrode film (26) is formed on a −Z side of the EC layer (30) when being viewed from a +X-direction. A whole overlapping region (24), where the transparent electrode film (22) and the reflecting electrode film (26) overlap each other, is included within the EC layer (30) when being viewed from the +X-direction.

11 Claims, 10 Drawing Sheets

(51) Int. Cl.
　　　*G02F 1/157*　　　(2006.01)
　　　*G02F 1/1335*　　(2006.01)
(58) Field of Classification Search
　　　USPC .................................. 359/265–275; 345/105
　　　See application file for complete search history.

(56) References Cited

U.S. PATENT DOCUMENTS

| | | | |
|---|---|---|---|
| 8,649,083 B2 * | 2/2014 | Luten | B60R 1/088 |
| | | | 359/267 |
| 8,902,151 B2 * | 12/2014 | Yashiro | G09G 3/38 |
| | | | 345/105 |
| 8,964,278 B2 * | 2/2015 | Baumann | B60R 1/08 |
| | | | 359/267 |
| 2004/0042059 A1 | 3/2004 | Minami | |
| 2004/0095630 A1 | 5/2004 | Fukazawa | |
| 2005/0068604 A1 | 3/2005 | Kukita | |

FOREIGN PATENT DOCUMENTS

| | | |
|---|---|---|
| JP | 08006076 | 1/1996 |
| JP | 2004004277 A2 | 1/2004 |
| JP | 2004170477 A2 | 6/2004 |
| JP | 2005099606 A2 | 4/2005 |
| WO | 03032068 A1 | 4/2003 |

\* cited by examiner

FIG. 11
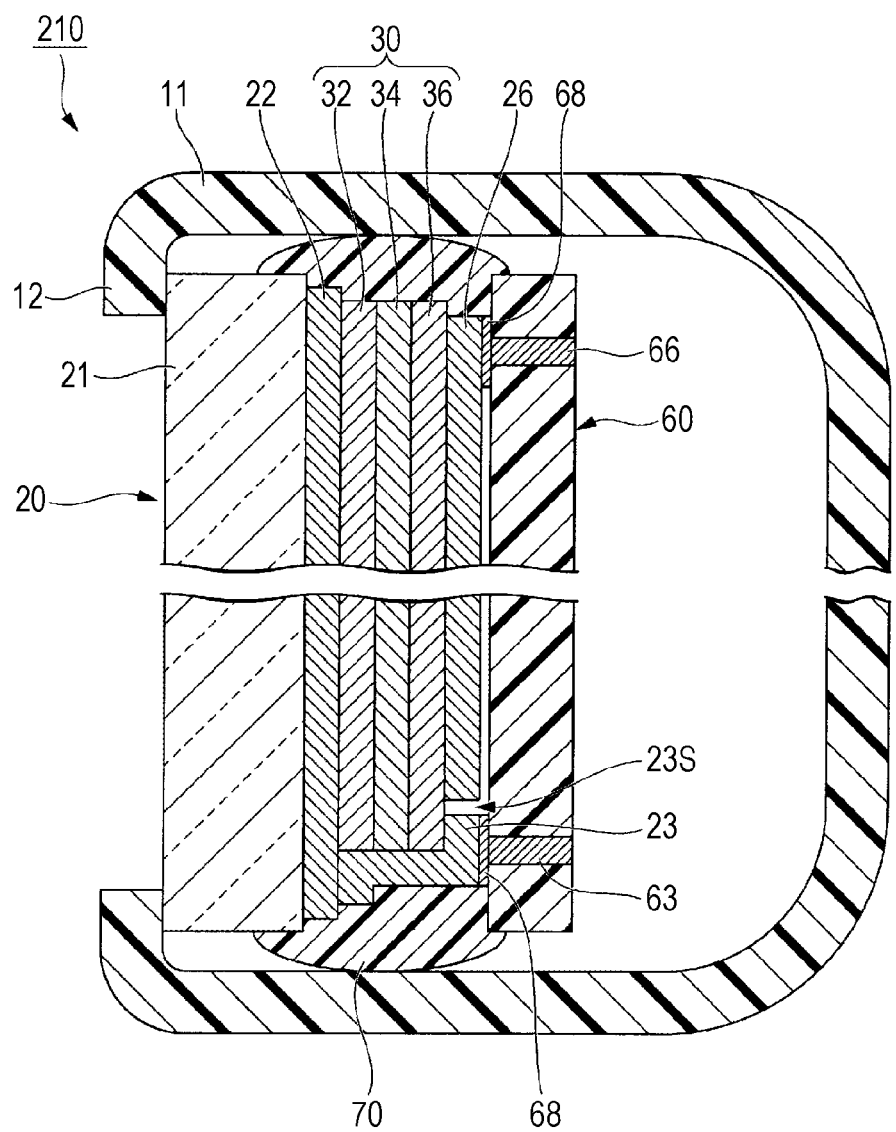
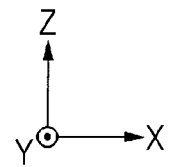

ELECTROCHROMIC MIRROR

TECHNICAL FIELD

The present invention relates to an auto dimming mirror that is applicable to, for example, a rearview mirror or a door mirror of a vehicle, in particular, to an electrochromic mirror that provides an anti-glare effect with an applied voltage that causes a redox reaction to change a color of the mirror.

BACKGROUND ART

In night driving, a driver may be dazzled by headlights of a car behind, which are reflected from a rearview mirror or a door mirror. Thus, an EC mirror, which includes an electrochromic (hereinafter sometimes referred to as "EC") layer that emits a color light upon application of a voltage, has been developed. The EC mirror applies a voltage to the EC layer to cause the EC layer to emit a color light when a surrounding area is dark and a bright light comes from a car behind. This can suppress the reflection of the light from the car behind, and reduce glare.

There has been known an EC mirror that includes a glass substrate, a transparent conductive film formed on a back side of the glass substrate, an EC layer formed on a back side of the transparent conductive film, and a reflection and electrode film formed on a back side of the EC layer (for example, see Patent Literature 1).

CITATION LIST

Patent Literature

Patent Literature 1: JP-A-2005-99606

SUMMARY OF INVENTION

Problems to be Solved by the Invention

In the above-described EC mirror, however, a material of the reflection and electrode film may reach the transparent conductive film via a side surface of the EC layer when the reflection and electrode film is formed on the back side of the EC layer. This causes a short-circuit between the transparent conductive film and the reflection and electrode film, which prevents the EC layer from emitting a color light.

In the EC mirror disclosed in Patent Literature 1, the transparent conductive film, the EC layer and the reflection and electrode film are disposed with being sequentially displaced from one another. However, when the transparent conductive film, the EC layer, and the reflection and electrode film, which have a rectangular shape as viewed from the normal direction of the glass substrate, are displaced from one another in a short side direction of the rectangular shape, the long sides of the respective layers are displaced from one another while the short sides of the respective layers overlap in part. In this case, the above-described short-circuit between the transparent conductive film and the reflection and electrode film may be caused in the part of the short sides.

Accordingly, an object of the present invention is to provide an EC mirror that can ensure the insulating properties between electrodes.

Solutions to the Problems

An electrochromic mirror according to the present invention has the following configurations.

(1) An electrochromic mirror includes a transparent electrode film, an electrochromic layer that emits a color light upon application of a voltage, and a reflecting electrode film. The transparent electrode film, the electrochromic layer, and the reflecting electrode film are sequentially laminated on a first surface of a transparent substrate. A protruding portion of the transparent electrode film is formed in a first direction of the electrochromic layer and a protruding portion of the reflecting electrode film is formed in a second direction of the electrochromic layer when being viewed from a normal direction of the transparent substrate, and a whole overlapping region where the transparent electrode film and the reflecting electrode film overlap each other is included within the electrochromic layer when being viewed from the normal direction.

With this configuration, the electrochromic mirror can be driven by coupling power feeding terminals to the transparent electrode film protruding portion and the reflecting electrode film protruding portion and applying a voltage to the electrochromic layer. Note that the whole overlapping region is included within the electrochromic layer when being viewed from a normal direction. The side surface of the electrochromic layer, therefore, does not overlap both of the transparent electrode film and the reflecting electrode film when being viewed from the normal direction. This can prevent a material of the reflecting electrode film from reaching the transparent electrode film via the side surfaces of the electrochromic layer when the reflecting electrode film is disposed. Accordingly, this configuration can ensure the insulating properties between the reflecting electrode film and the transparent electrode film.

(2) In the electrochromic mirror described in (1), it is preferable that an outline of the electrochromic layer is larger than an outline of the transparent electrode film and an outline of the reflecting electrode film when being viewed from the normal direction.

With this configuration, the whole overlapping region can be surely included within the electrochromic layer.

(3) In the electrochromic mirror described in (1) or (2), it is preferable that the transparent electrode film, the electrochromic layer, and the reflecting electrode film have a shape with a long side direction and a short side direction, and are disposed to be sequentially displaced from one another in the short side direction when being viewed from the normal direction, and a power feeding terminal for transparent electrode is coupled to the protruding portion of the transparent electrode film in the long side direction and a power feeding terminal for reflecting electrode is coupled to the protruding portion of the reflecting electrode film in the long side direction when being viewed from the normal direction.

With this configuration, the power feeding terminal for transparent electrode is coupled to the protruding portion of the transparent electrode film along a long side direction of the transparent electrode film. This increases a contact area between them, and thus contact resistance can be reduced. In addition, this configuration can shorten a distance from the power feeding terminal for transparent electrode to the reflecting electrode film via respective portions within the surface of the transparent electrode film, and thus the response speed of the electrochromic mirror can be increased.

(4) In the electrochromic mirror described in (3), it is preferable that a contact area between the protruding portion of the transparent electrode film and the power feeding terminal for transparent electrode is larger than a contact area between the protruding portion of the reflecting electrode film and the power feeding terminal for reflecting electrode.

With this configuration, a contact area on a side of the transparent electrode film that has relatively large electrical resistance is large, which reduces a distance from the power feeding terminal for transparent electrode to the reflecting electrode film via respective portions within the surface of the transparent electrode film. Thus, the response speed of the electrochromic mirror can be increased. Incidentally, the increase in the contact area on the side of the transparent electrode film that has relatively large electrical resistance reduces the resistance difference between the transparent electrode film and the reflecting electrode film. When the resistance difference is large, a color change upon application of a voltage occurs gradually from the vicinity of the power feeding terminal for transparent electrode. While, the decrease in the resistance difference can approximately simultaneously causes a color change within the surface of the transparent electrode film. On the other hand, the decrease in the contact area on the side of the reflecting electrode film allows to freely design the layout of the power feeding terminal for reflecting electrode, as well as achieve downsizing, weight reduction, and cost reduction of the power feeding terminal for reflecting electrode.

(5) The electrochromic mirror described in any one of (1) to (4) further includes a mirror holder that holds the transparent substrate. It is preferable that the mirror holder covers a peripheral edge portion of a second surface of the transparent substrate, the second surface being a backside surface of the first surface.

The peripheral edge portion of the transparent substrate is a portion where switching between emission and non-emission of a color light of the electrochromic mirror is difficult. Accordingly, this portion can be covered by a mirror holder to improve the appearance of the electrochromic mirror.

(6) An electrochromic mirror includes a transparent electrode film, an electrochromic layer that emits a color light upon application of a voltage, and a reflecting electrode film. The transparent electrode film, the electrochromic layer, and the reflecting electrode film are sequentially laminated on a first surface of a transparent substrate, and the whole electrochromic layer is included within the transparent electrode film and the whole reflecting electrode film is included within the electrochromic layer when being viewed from a normal direction of the transparent substrate.

With this configuration, the whole reflecting electrode film is included within the electrochromic layer. This can prevent the material of the reflecting electrode film from reaching the side surface of the electrochromic layer when the reflecting electrode film is formed. Accordingly, this configuration can ensure insulating properties between the reflecting electrode film and the transparent electrode film.

Advantageous Effects of the Invention

According to the present invention, the material of the reflecting electrode film can be prevented from reaching the transparent electrode film via the side surface of the electrochromic layer when the reflecting electrode film is formed. Accordingly, the insulating properties between the reflecting electrode film and the transparent electrode film can be ensured.

BRIEF DESCRIPTION OF THE DRAWINGS

FIG. 11 is an explanatory view illustrating an electrochromic mirror according to a second embodiment, and is a cross-sectional view corresponding to the portion taken along the line A-A of FIG. 2.

DESCRIPTION OF EMBODIMENTS

The embodiments of the present invention will be described below with reference to the accompanying drawings. An electrochromic (hereinafter sometimes referred to as "EC") mirror of the present invention is applicable to a variety of mirrors such as a vehicular mirror. The following describes the electrochromic mirror of the present invention using an example in which the electrochromic mirror is used as a vehicular mirror. The following description may be provided with the drawings, in which the front-rear direction of a vehicle is referred to as an X-direction (the front direction is a +X-direction while the rear direction is a −X-direction); the right-left direction of the vehicle is referred to as a Y-direction (the right direction is a +Y-direction while the left direction is a −Y-direction); the vertical direction of the vehicle is referred to as a Z-direction (the upward direction is a +Z-direction while the downward direction is a −Z-direction).

Figure 1:
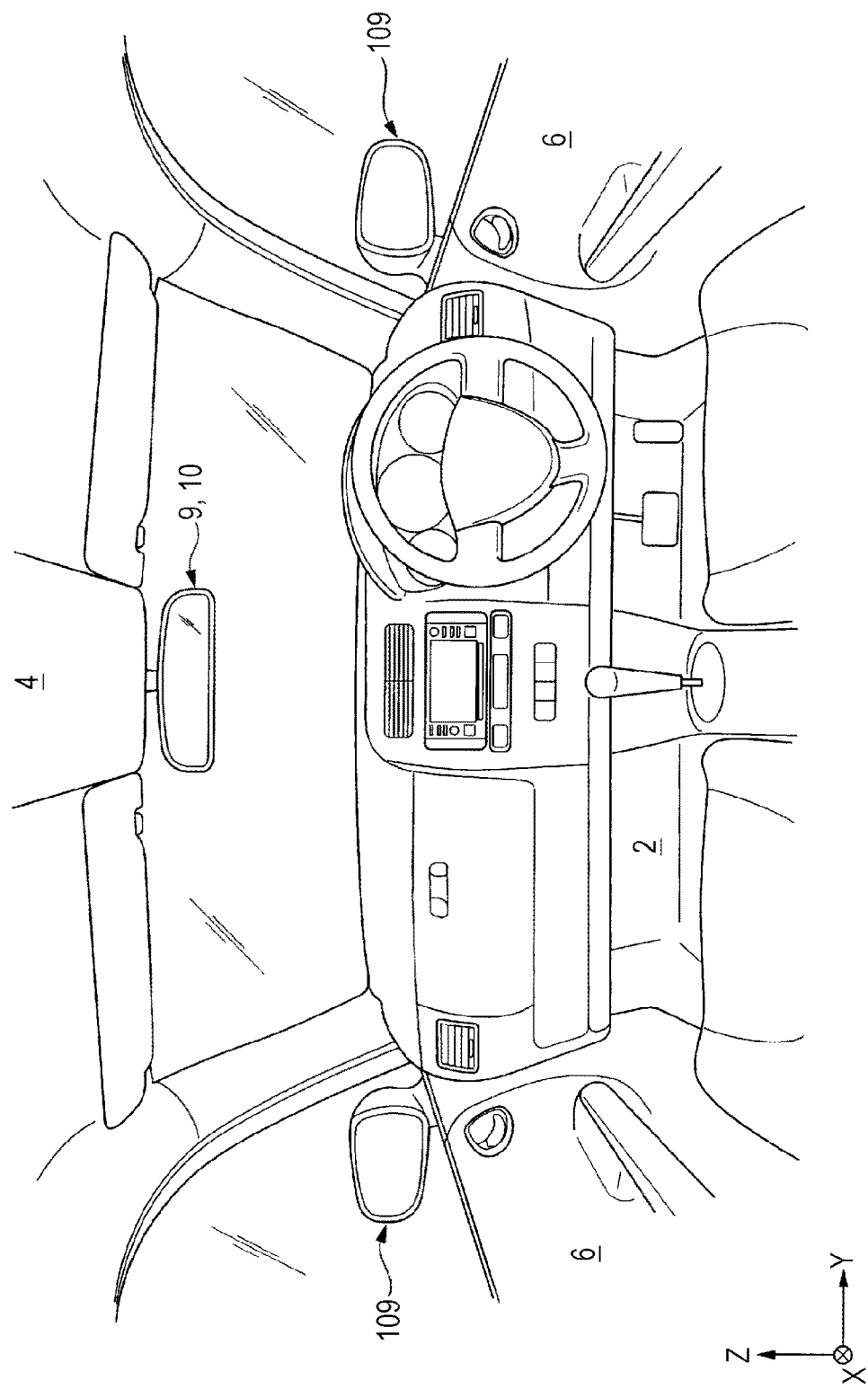
FIG. 1 is a view illustrating a front portion of a vehicle interior, as viewed from a rear side.

FIG. 1 is a view illustrating a front portion of a vehicle interior 2, as viewed from the behind. A rearview mirror 9 is disposed at the front center portion of a ceiling 4 of the vehicle interior 2. The rearview mirror 9 is disposed with the normal direction of its mirror surface facing the rear side of the vehicle. The rearview mirror 9 has a substantially rectangular shape in which the right-left direction of the vehicle is a long side direction while the vertical direction of the vehicle is a short side direction. The rearview mirror 9 may have a track-like shape having curved short sides. In addition, both long sides of the rearview mirror 9 are substantially straight lines. In a precise sense, at least one of the long sides (upper side in FIG. 1) may be a slightly curved line (with a large curvature radius). A driver of the vehicle can visually recognize a situation behind the vehicle via the rearview mirror 9. At the outside of the vehicle interior 2, door mirrors 109 are disposed at the front upper portions of doors 6. The driver of the vehicle can visually recognize a situation obliquely behind the vehicle via the door mirrors 109. An EC mirror 10 of the present invention is applicable to a variety of vehicular minors such as the rearview mirror 9 and the door mirror 109. The following describes the EC mirror 10 using an example in which the EC mirror 10 is used as the rearview mirror 9.

First Embodiment

Figure 2:
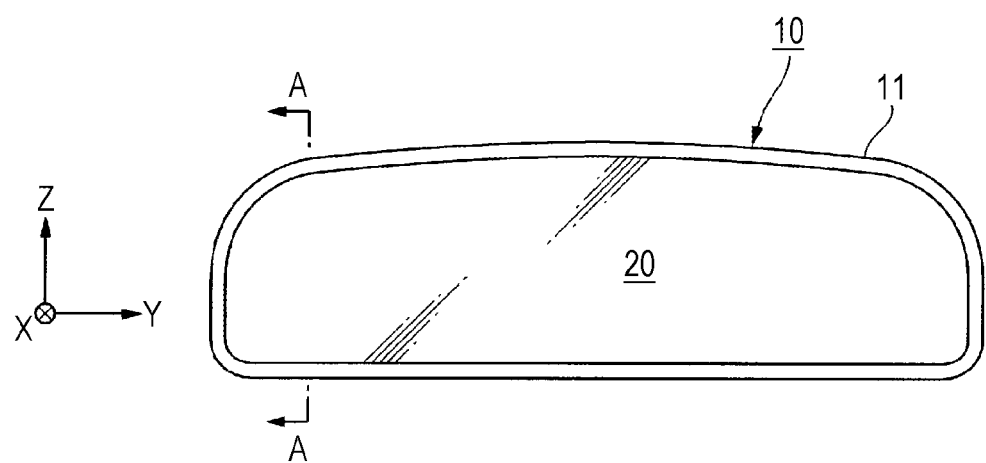
FIG. 2 is a front view illustrating an electrochromic mirror according to a first embodiment.
Figure 3:
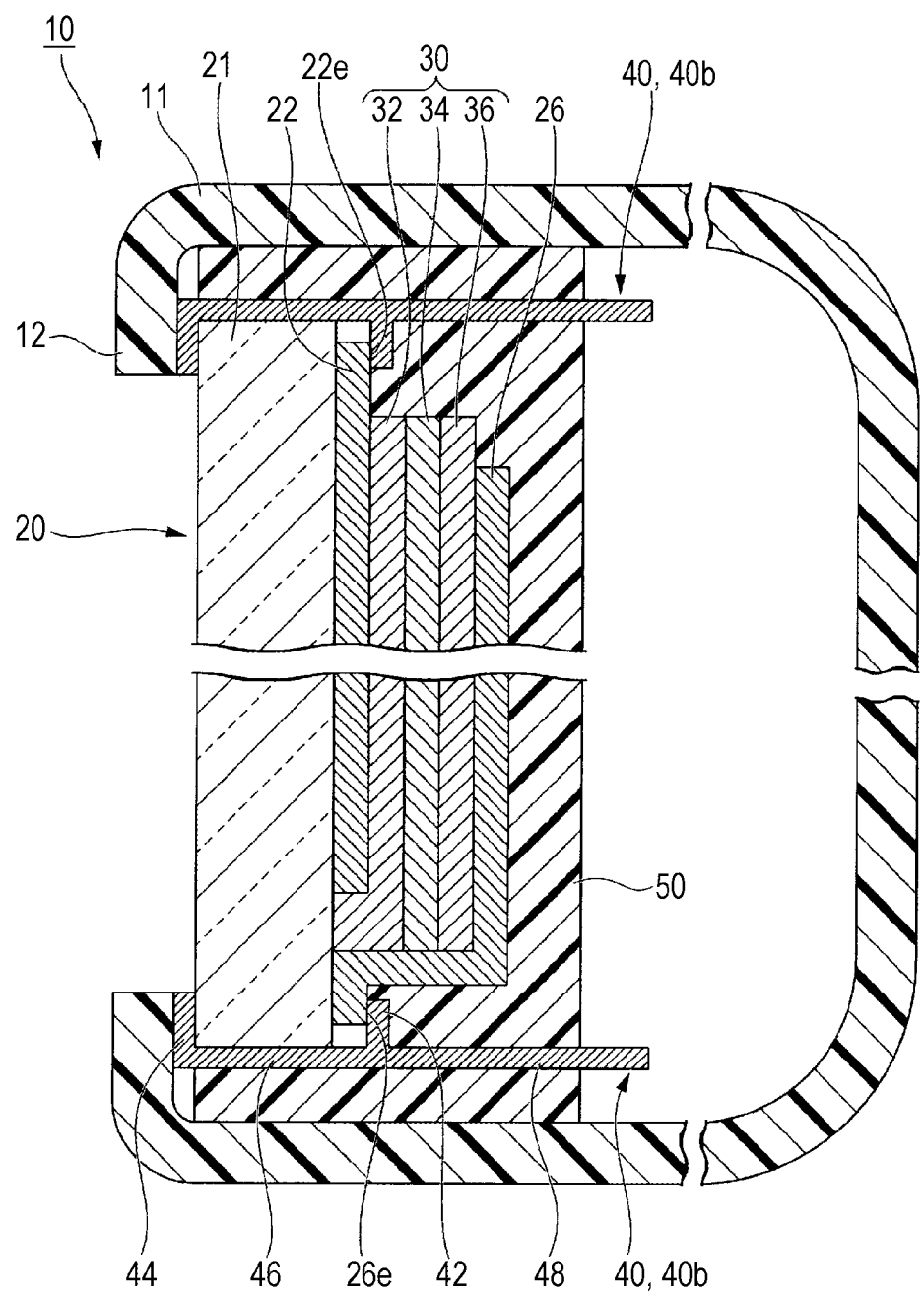
FIG. 3 is a cross-sectional view taken along the line A-A of FIG. 2.

FIG. 2 is a front view illustrating the EC mirror 10 according to the first embodiment. FIG. 3 is an explanatory view of the EC mirror 10 according to the first embodiment, and is a cross-sectional view taken along the line A-A of FIG. 2. As illustrated in FIG. 3, the EC mirror 10 includes an EC mirror main body 20, a power feeding terminal 40 that feeds power to the EC mirror main body 20, an ion-insulating material 50 that coats the EC mirror main body 20, and a mirror holder 11 that supports the EC mirror main body 20. The EC mirror main body 20 is formed such that a transparent electrode film 22, an EC layer 30 that emits a color light with an applied voltage, and a reflecting electrode film 26 are sequentially laminated on the +X surface (first surface) of a transparent substrate 21.

The transparent substrate 21 is made of a material having visible-light transparency (e.g. glass). The transparent electrode film 22 is made of a material having visible-light transparency and conductivity (e.g. ITO), and has a thickness of, for example, 200 nm. The reflecting electrode film 26 is made of a metallic material having visible-light reflectivity and conductivity (e.g. aluminum (Al) or silver (Ag)), and has a thickness of, for example, 130 nm. A visible-light, which enters the EC mirror 10 from the −X surface of the transparent substrate 21, is reflected by the reflecting electrode film 26, and is emitted from the −X surface of the transparent substrate 21.

The EC layer 30 is formed such that an oxidized color film 32, a solid electrolytic film 34, and a reduction color film 36 are sequentially laminated. All of the oxidized color film 32, the solid electrolytic film 34 and the reduction color film 36 have visible-light transparency and insulation properties. The oxidized color film 32 is made of a material that emits a color light by an oxidation reaction (e.g. a mixed material of iridium oxide ($IrO_2$) and tin oxide ($SnO_2$)), and has a thickness of, for example, 150 nm. The solid electrolytic film 34 is made of a material that is electrochemically stable (e.g. tantalum oxide ($Ta_2O_5$)), and has a thickness of, for example, 500 nm. The reduction color film 36 is made of a material that emits a color light by a reduction reaction (e.g. tungsten oxide ($WO_3$)), and has a thickness of, for example, 500 nm.

In a non-antiglare state, the reflectivity of the EC mirror 10 is high since the EC layer 30 is colorless and transparent. Therefore, a light reflected by the EC mirror 10, which comes from head lights of a car behind, becomes strong. Thus, the driver may be dazzled in night driving.

Accordingly, the EC layer 30 is coupled to an external electric power supply to apply a voltage such that the reflecting electrode film 26 becomes negative with respect to the transparent electrode film 22. This generates hydrogen ions from a trace quantity of water contained in the solid electrolytic film 34, and the generated ions move to the reduction color film 36, while electrons move from the oxidized color film 32 to the reduction color film 36 via the electric power supply. Consequently, the reduction color film 36 emits a color light by a reduction reaction, and the oxidized color film 32 emits a color light by an oxidation reaction. Such emission of color lights from the EC layer 30 decreases the reflectivity of the EC mirror 10, which weakens the reflected light to reduce glare.

Even when application of a voltage to the EC layer 30 is stopped, the electrons do not move through the solid electrolytic film 34, and accordingly the EC layer 30 keeps emitting a color light. Conversely, when a voltage (reverse voltage) that is opposite to the previously-described voltage (forward voltage) is applied to the EC layer 30, the hydrogen ions move from the reduction color film 36 to the solid electrolytic film 34, while the electrons move from the reduction color film 36 to the oxidized color film 32 via the electric power supply. This causes the EC layer 30 to stop emitting a color light.

When the oxidized color film 32 is made of iridium oxide ($IrO_2$); the solid electrolytic film 34 is made of tantalum oxide ($Ta_2O_5$); and the reduction color film 36 is made of tungsten oxide ($WO_3$), the following reactions are carried out at the respective films during emission and non-emission of a color light.

Figure 4:
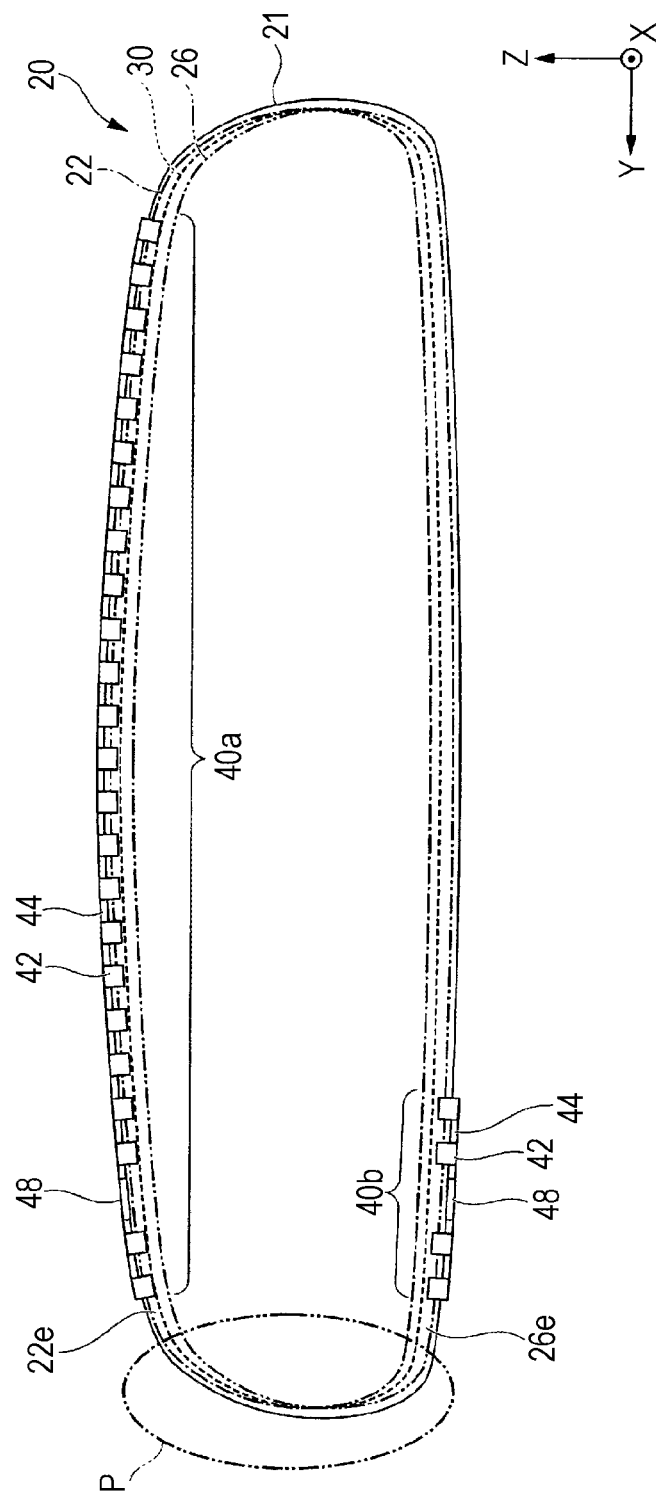
FIG. 4 is a back view illustrating a main body of the electrochromic mirror main body.
Figure 5:
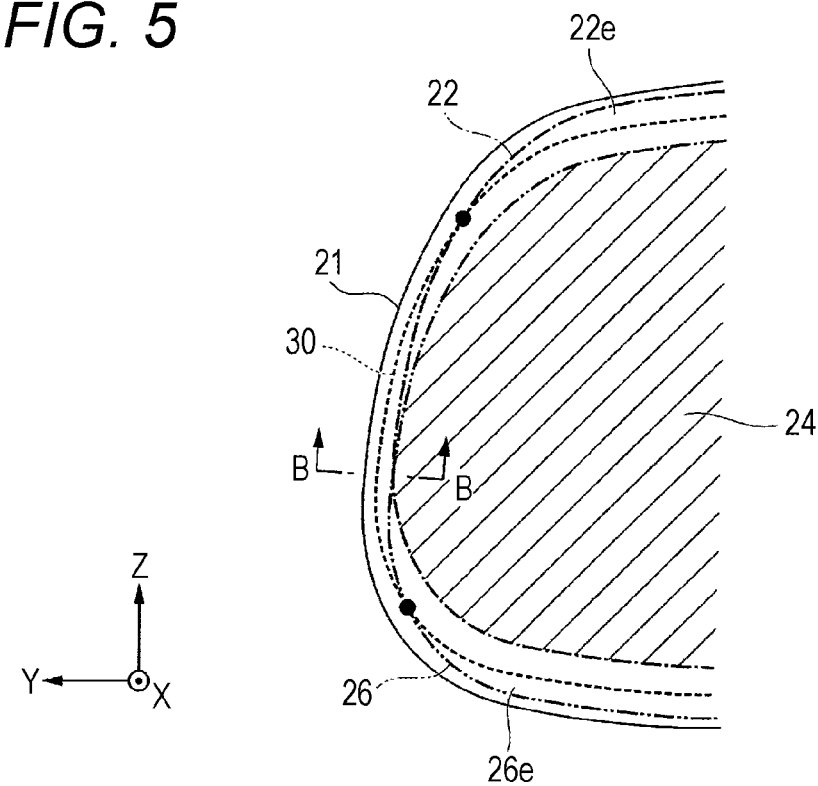
FIG. 5 is an enlarged view illustrating a P portion of FIG. 4.

(During Non-Emission of Color Light)
Oxidized color film 32: $Ir(OH)_n + xOH^-$
Solid electrolytic film 34: $Ta_2O_5 + xH_2O$
Reduction color film 36: $WO_3 + xH^+ xe^-$
(During Emission of Color Light)
Oxidized color film 32: $Ir(OH)_{n+x} + xe^-$
Solid electrolytic film 34: $Ta_2O_5 + xH^+ + xOH^-$
Reduction color film 36: $H_xWO_3$ FIG. 4 is a back view of the EC mirror main body 20 as viewed from the +X-direction that is the normal direction of the transparent substrate 21. FIG. 5 is an enlarged view illustrating a P portion of FIG. 4. Note that, in FIGS. 4 and 5, an outline of the transparent substrate 21 is indicated by a solid line; an outline of the transparent electrode film 22 is indicated by a dashed-dotted line; an outline of e EC layer 30 is indicated by a dashed line; and an outline of the reflecting electrode film 26 is indicated by a dashed-two dotted line. In FIGS. 4 and 5, the ion-insulating material 50 is omitted.

As described above, the rearview mirror has a substantially rectangular shape. Thus, the transparent substrate 21 also has a substantially rectangular shape as illustrated in FIG. 4. Also, the transparent electrode film 22, the EC layer 30 and the reflecting electrode film 26 have a substantially rectangular shape in which the Y-direction is a long side direction while the Z-direction is a short side direction. The transparent electrode film 22, the EC layer 30, and the reflecting electrode film 26 are disposed with being sequentially displaced from one another in the Z-direction. This forms a protruding portion 22e of the transparent electrode film (transparent electrode film protruding portion) in the +Z-direction (first direction) of the EC layer 30, as well as forms a protruding portion 26e of the reflecting electrode film 26 (reflecting electrode film protruding portion) in the −Z-direction (second direction) of the EC layer 30.

Returning to FIG. 3, a power feeding terminal for transparent electrode 40a is coupled to the transparent electrode film protruding portion 22e, while a power feeding terminal for reflecting electrode 40b is coupled to the reflecting electrode film protruding portion 26e.

The power feeding terminal for reflecting electrode 40b is made of a metallic material having conductivity (e.g. aluminum (Al)). The power feeding terminal for reflecting electrode 40b includes: an electrode contacting portion 42 that contacts the +X surface of the reflecting electrode film protruding portion 26e; a substrate contacting portion 44 that contacts the −X surface of the transparent substrate 21; a coupling portion 46 that couples the electrode contacting portion 42 and the substrate contacting portion 44; and a post portion 48 that is disposed upright in the +X-direction from the electrode contacting portion 42. The power feeding terminal for reflecting electrode 40b sandwiches the reflecting electrode film protruding portion 26e and the transparent substrate 21 with the electrode contacting portion 42, the substrate contacting portion 44, and the coupling portion 46 to secure the EC mirror main body 20. The same applies to the power feeding terminal for transparent electrode 40a.

As illustrated in FIG. 4, the coupling portion 46 of the power feeding terminal for transparent electrode 40a is continuously formed in the Y-direction. On the other hand, the electrode contacting portion 42 (and the substrate contacting portion) is intermittently disposed. Namely, the electrode contacting portion 42 (and the substrate contacting portion) has a plurality of small pieces that are arranged with being spaced one another. The power feeding terminal for transparent electrode 40a is formed by punching out a metal piece having a predetermined shape from a metal plate. Then, the power feeding terminal for transparent electrode 40a is secured by curving the coupling portion 46 along the side surface of the transparent substrate 21 while folding the electrode contacting portion 42 to contact the +X surface of the transparent electrode film protruding portion 26e (and folding the substrate contacting portion to contact the −X surface of the transparent substrate 21). Here, since the electrode contacting portion 42 (and the substrate contacting portion) is intermittently formed, the coupling portion 46 is easily curved as well as the electrode contacting portion 42 (and the substrate contacting portion) is easily folded. The same applies to the power feeding terminal for reflecting electrode 40b.

As described above, the transparent electrode film 22, the EC layer 30, and the reflecting electrode film 26 are disposed with being sequentially displaced off in the Z-direction that is the short side direction. Therefore, the reflecting electrode film protruding portion 26e and the transparent electrode film protruding portion 22e extend in the Y-direction that is the long side direction. The electrode contacting portion 42 of the power feeding terminal for reflecting electrode 40b is coupled to the reflecting electrode film protruding portion 26e along the Y-direction. Also, the electrode contacting portion 42 of the power feeding terminal for transparent electrode 40a is coupled to the transparent electrode film protruding portion 22e along the Y-direction. This increases a contact area between the transparent electrode film 22 and the power feeding terminal for transparent electrode 40a, and thus contact resistance between them can be reduced. Furthermore, this decreases a distance from the power feeding terminal for transparent electrode 40a to respective portions in the Y-Z plane of the transparent electrode film 22, and thus the response speed of the EC mirror 10 can be increased.

As illustrated in FIG. 4, a contact area between the transparent electrode film protruding portion 22e and the electrode contacting portion 42 of the power feeding terminal for transparent electrode 40a is larger than a contact area between the reflecting electrode film protruding portion 26e and the electrode contacting portion 42 of the power feeding terminal for reflecting electrode 40b. In general, the electrical resistance of the transparent electrode film 22, which is made of a transparent conductive material, is larger than that of the reflecting electrode film 26, which is made of a metallic material or the like. Accordingly the increase in the contact area on the side of the transparent electrode film 22 decreases the distance from the power feeding terminal for transparent electrode 40a to the reflecting electrode film 26 via the respective portions in the Y-Z plane of the transparent electrode film 22, which can the response speed of the EC mirror 10. Incidentally, the increase in the contact area on the side of the transparent electrode film 22, where the electrical resistance is relatively large, reduces the resistance difference between the transparent electrode film 22 and the reflecting electrode film 26. When the resistance difference is large, a color change in response to an applied voltage occurs gradually from the vicinity of the power feeding terminal for transparent electrode 40a. On the other hand, the decrease in resistance difference can approximately simultaneously causes a color change within the surface. In addition, the decrease in the contact area on the side of the reflecting electrode film 26 allows to freely design the layout of the power feeding terminal for reflecting electrode 40b, as well as achieve downsizing, weight reduction, and cost reduction of the power feeding terminal for reflecting electrode 40b.

Incidentally, as described above, move of positively charged ions such as hydrogen ions plays an important role for emission of a color light from the EC layer 30. If the positively charged ions (e.g. sodium ions) enter the EC layer 30 from outside to generate a compound such as hydroxide (e.g. NaOH), the conductivity of the positively charged ions in the EC layer 30 decreases to suppress a redox reaction. Therefore, it is necessary to prevent the positively charged ions from entering the EC layer 30 from outside.

Accordingly, the EC mirror main body 20 is coated by the ion-insulating material 50 as illustrated in FIG. 3. The ion-insulating material 50 is made of a material (e.g. aluminum oxide ($Al_2O_3$)) that blocks the positively charged ions such as metallic ions. The ion-insulating material 50 covers the rest portions of the EC mirror main body 20 with exposing the −X surface of the transparent substrate 21 that is the mirror surface of the EC mirror main body 20.

The mirror holder 11 illustrated in FIG. 3 is made of, for example, a resin material. The mirror holder 11 is secured to the EC mirror main body 20 at a portion that is not illustrated so as to hold the EC mirror main body 20. The mirror holder 11 covers the rest portions with exposing the −X surface of the transparent substrate 21 that is the mirror surface of the EC mirror main body 20. The mirror holder 11 includes a frame portion 12 that covers the peripheral edge portion of the −X surface (second surface) of the transparent substrate 21 with exposing the center portion of the −X surface. The peripheral edge portion of the transparent substrate 21 is a portion where switching between emission and non-emission of a color light of the EC mirror 10 is difficult.

Accordingly; covering this portion with the frame portion 12 of the mirror holder 11 can improve the appearance of the EC mirror 10.

Though not illustrated, the EC mirror 10 includes an ambient light sensor that senses the brightness of the surrounding area of the vehicle, and an incident light sensor that senses the intensity of an incident light that enters the EC mirror 10 from behind the vehicle. In addition, a control unit is disposed, to which the detection results of the ambient light sensor and the incident light sensor are input. The power feeding terminal 40 is coupled to the electric power supply. The control unit determines, based on the detection results of the ambient light sensor and the incident light sensor, whether or not a dazzling light enters the EC mirror 10 from the rear side while the surrounding area is dark. When the determination is shifted to Yes, the control unit drives the electric power supply to apply a forward voltage to the EC layer 30 for a predetermined period to cause the EC layer 30 to emit color light. When the determination is shifted to No, the control unit drives the electric power supply to apply a reverse voltage to the EC layer 30 for a predetermined period to cause the EC layer 30 to stop emitting a color light.

Separate Structure of Electrode Film

As described above, the transparent electrode film 22, the EC layer 30, and the reflecting electrode film 26 are disposed with being sequentially displaced from one another in the Z-direction.

As illustrated in FIG. 5, there is an overlapping region 24 (hatched region in FIG. 5) where the transparent electrode film 22 and the reflecting electrode film 26 overlap each other when being viewed from the +X-direction. The whole overlapping region 24 is included within the EC layer 30. Note that the outline of the EC layer 30 (particularly, the length in the Y-direction) is larger than the outline of the transparent electrode film 22 and the outline of the reflecting electrode film 26. Accordingly, a state that the whole overlapping region 24 is included within the EC layer 30 (particularly, in the Y-direction) can be reliably provided.

Thus, since the whole overlapping region 24 is included within the EC layer 30 when being viewed from the +X-direction, the transparent electrode film protruding portion 22e and the reflecting electrode film protruding portion 26e do not overlap each other. Namely, the EC layer 30 exists in a middle region between the transparent electrode film protruding portion 22e and the reflecting electrode film protruding portion 26e in the Z-direction, and the EC layer 30 electrically separates these portions.

Figure 6:
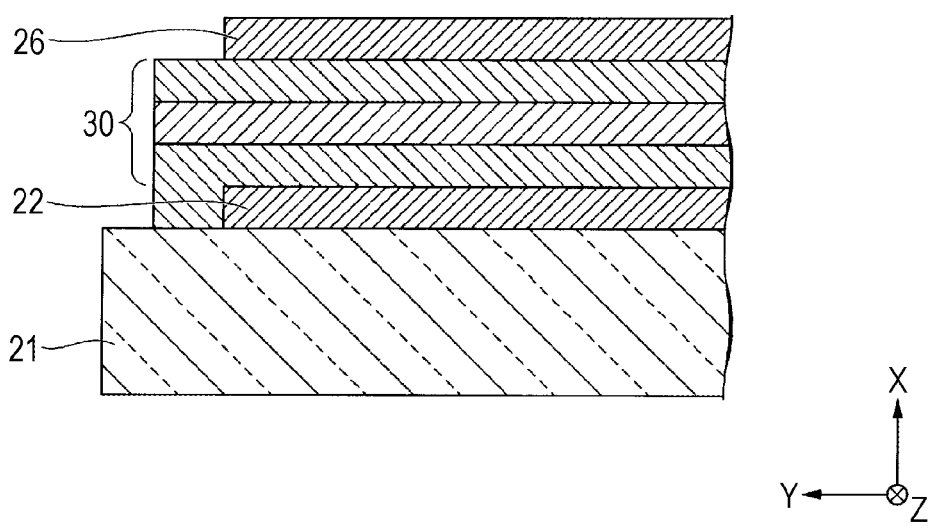
FIG. 6 is a cross-sectional view taken along the line B-B of FIG. 5.

FIG. 6 is a cross-sectional view taken along the line B-B (the above-described middle region) of FIG. 5. As illustrated in FIG. 6, in the above-described middle region, the EC layer 30 protrudes from the end portion in the Y-direction of the transparent electrode film 22 and the end portion in the Y-direction of the reflecting electrode film 26. In this case, the side surface of the EC layer 30 overlaps neither one of the transparent electrode film 22 and the reflecting electrode film 26 when being viewed from the +X-direction.

On the other hand, at the +Z side region of the EC mirror main body 20, the end portion of the transparent electrode film 22 protrudes from the end portion of the EC layer 30 in the +Z-direction, while the end portion of the reflecting electrode film 26 retracts from the end portion of the EC layer 30 in the −Z-direction, as illustrated in FIG. 3. In this case, the side surface of the EC layer 30 overlaps the transparent electrode film 22, but does not overlap the reflecting electrode film 26 when being viewed from the +X-direction.

Also, at the −Z side region of the EC mirror main body 20, the end portion of the reflecting electrode film 26 protrudes from the end portion of the EC layer 30 in the −Z-direction, while the end portion of the transparent electrode film 22 retracts from the end portion of the EC layer 30 in the +Z-direction. In this case, the side surface of the EC layer 30 overlaps the reflecting electrode film 26, but does not overlap the transparent electrode film 22 when being viewed from the +X-direction.

Thus, the side surface of the EC layer 30 does not overlap both of the transparent electrode film 22 and the reflecting electrode film 26 around the whole circumference of the EC mirror main body 20 since the whole overlapping region 24 is included within the EC layer 30 when being viewed from the +X-direction. This prevents the material of the reflecting electrode film 26 from reaching the transparent electrode film 22 via the side surface of the EC layer 30 when the reflecting electrode film 26 is formed.

Method for Fabricating EC Mirror

The following describes a method for fabricating the above-described EC mirror 10. FIGS. 7 to 10 are explanatory views for describing a method for fabricating the EC mirror 10 according to the first embodiment, which are cross-sectional views corresponding to a portion taken along the line A-A of FIG. 2. In FIGS. 7 to 10, (a) illustrates a situation before film formation while (b) illustrates a situation aft formation. Any film forming method such as sputtering and evaporation is available to form respective films.

Figure 7:
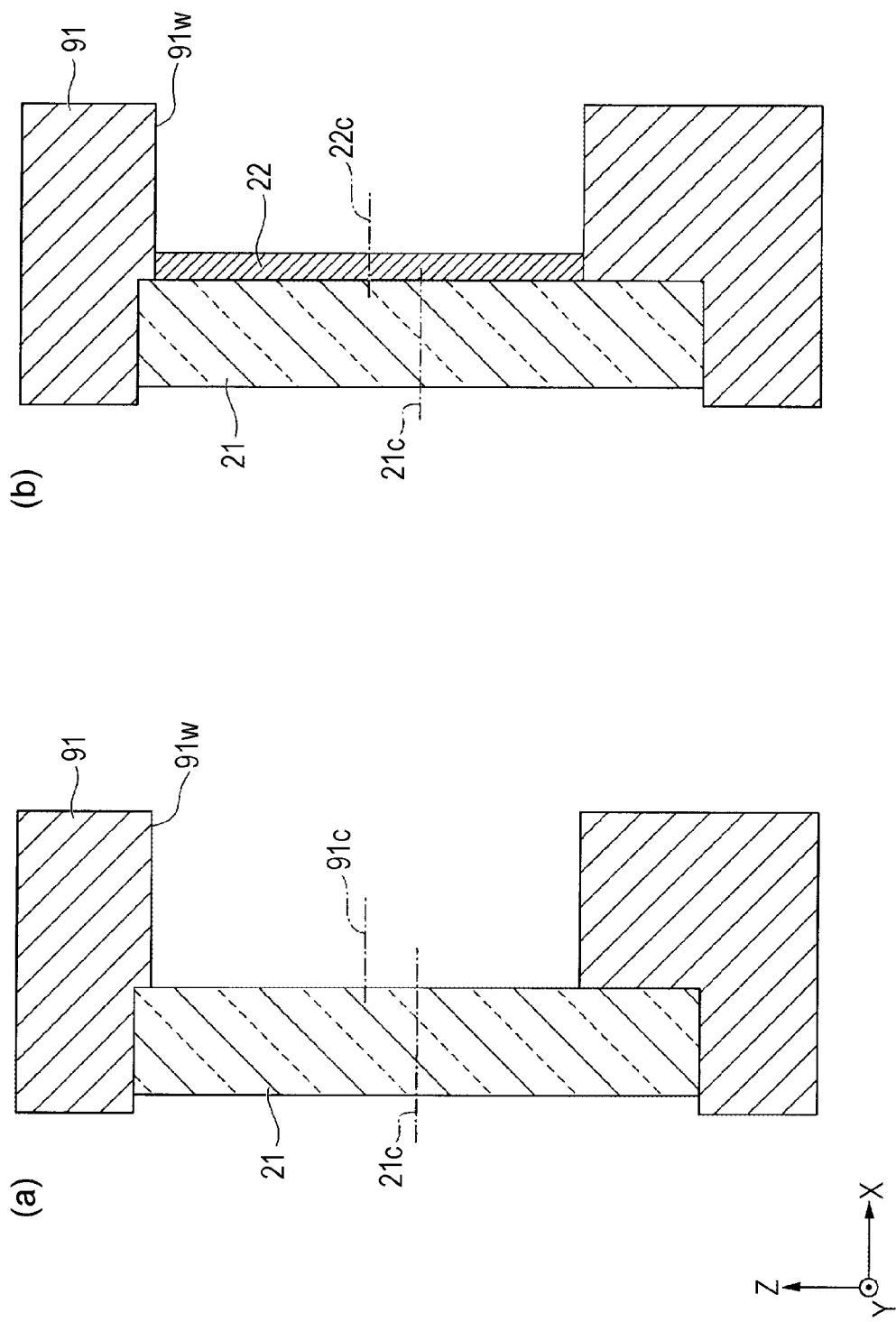
FIG. 7 includes first explanatory views for describing a method for fabricating the electrochromic mirror according to the first embodiment, which are cross-sectional views corresponding to a portion taken along the line A-A of FIG. 2, wherein FIG. 7($a$) is a cross-sectional view illustrating a state before film formation and FIG. 7($b$) is a cross-sectional view illustrating a state after film formation.

First, the transparent electrode film 22 is formed as illustrated in FIG. 7. In particular, the transparent substrate 21 set to a first formation jig 91 as illustrated in FIG. 7(a). The first film formation jig 91 includes an opening portion 91w that exposes the +X side of the transparent substrate 21. A Z-direction center portion 91c of the opening portion 91w is disposed at the +Z side of a center portion 21c in the Z-direction of the transparent substrate 21. Then, the first film formation jig 91 is masked, and the transparent electrode film 22 is formed at the +X side of the transparent substrate 21 through the opening portion 91w as illustrated in FIG. 7(b). This forms the transparent electrode film 22 with displacing a center portion 22c in the Z-direction of the transparent electrode film 22 from the center portion 21c in the Z-direction of the transparent substrate 21 to the +Z side.

Figure 8:
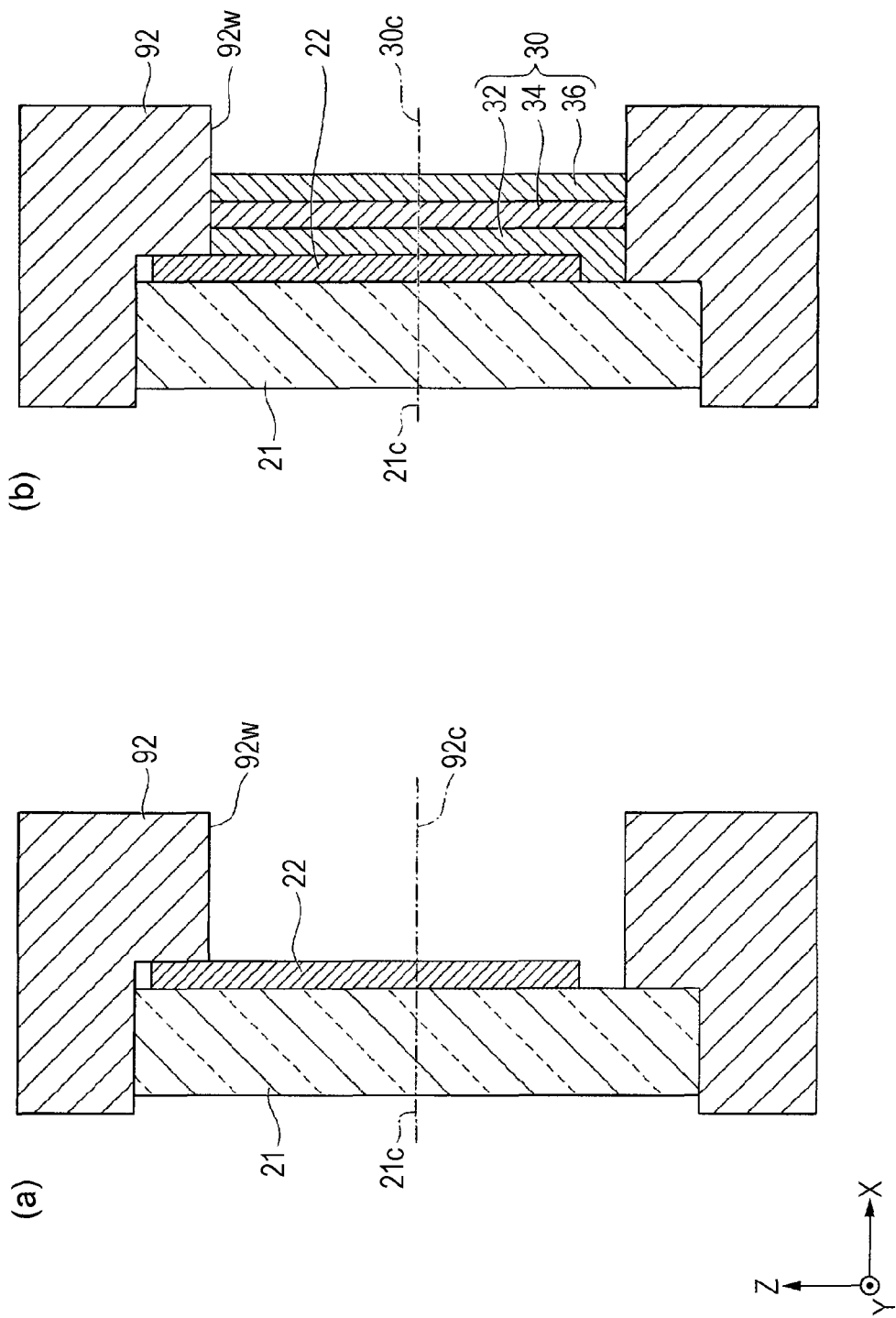
FIG. 8 includes second explanatory views for describing the method for fabricating the electrochromic mirror according to the first embodiment, which are cross-sectional views corresponding to the portion taken along the line A-A of FIG. 2, wherein FIG. 8($a$) is a cross-sectional view illustrating a state before film formation and FIG. 8($b$) is a cross-sectional view illustrating a state after film formation.

Next, the EC layer 30 is formed as illustrated in FIG. 8. In particular, the transparent substrate 21 is set to a second film formation jig 92 as illustrated in FIG. 8(a). The second film formation jig 92 includes an opening portion 92w that exposes the +X side of transparent substrate 21. A Z-direction center portion 92c of the opening portion 92w is disposed at the substantially same position as the center portion 21c in the Z-direction of transparent substrate 21. Then, the second film formation jig 92 is masked, and the EC layer 30 is formed at the +X side of the transparent substrate 21 through the opening portion 92w as illustrated in FIG. 8(b). The oxidized color film 32, the solid electrolytic film 34, and the reduction color film 36 are sequentially formed as the EC layer 30. This forms the EC layer 30 with placing a center portion 30c in the Z-direction of the EC layer 30 at the substantially same position as the center portion 21c in the Z-direction of transparent substrate 21.

Figure 9:
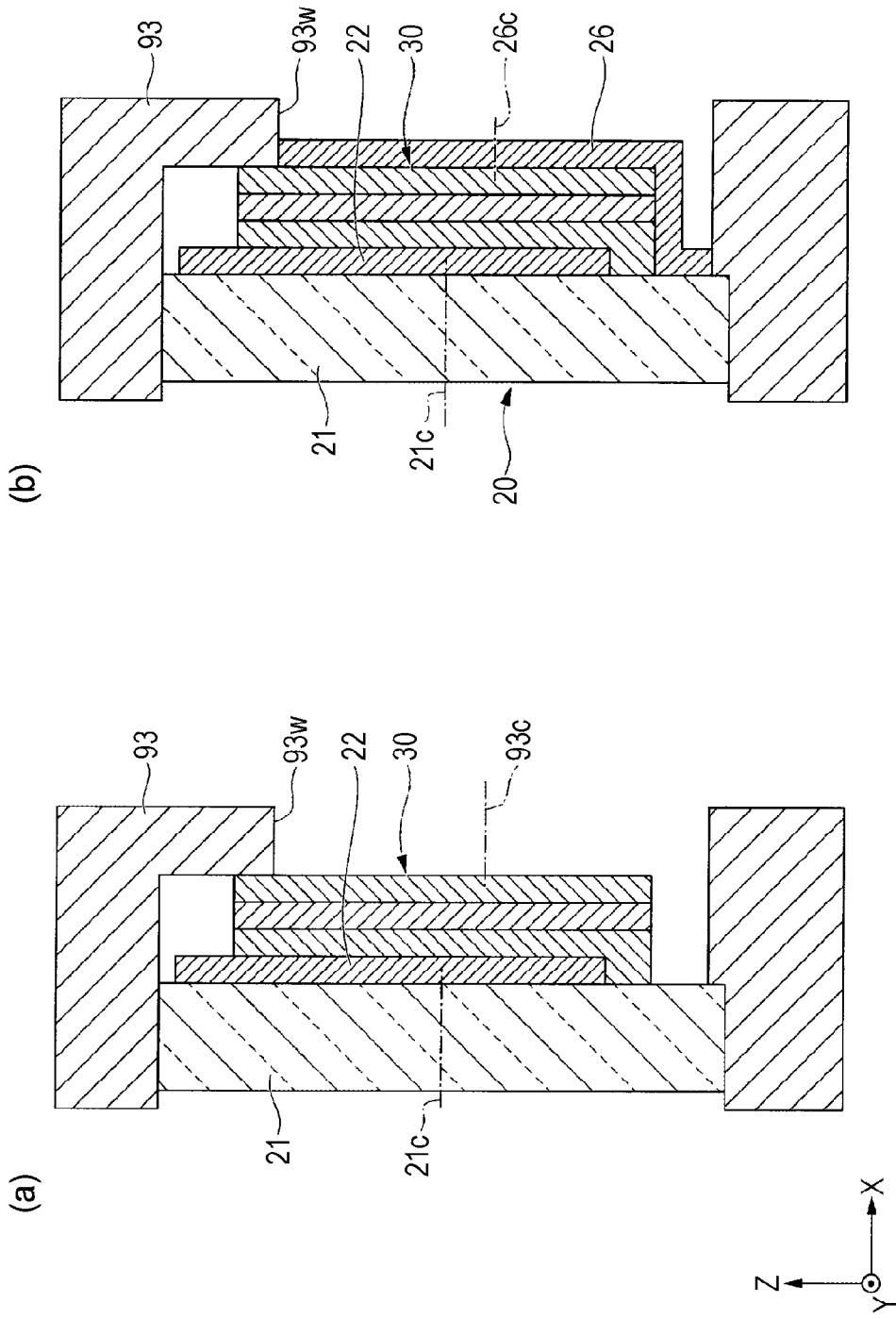
FIG. 9 includes third explanatory views for describing the method for fabricating the electrochromic mirror according to the first embodiment, which are cross-sectional views corresponding to the portion taken along the line A-A of FIG. 2, wherein FIG. 9($a$) is a cross-sectional view illustrating a state before film formation and FIG. 9($b$) is a cross-sectional view illustrating a state after film formation.
Figure 10:
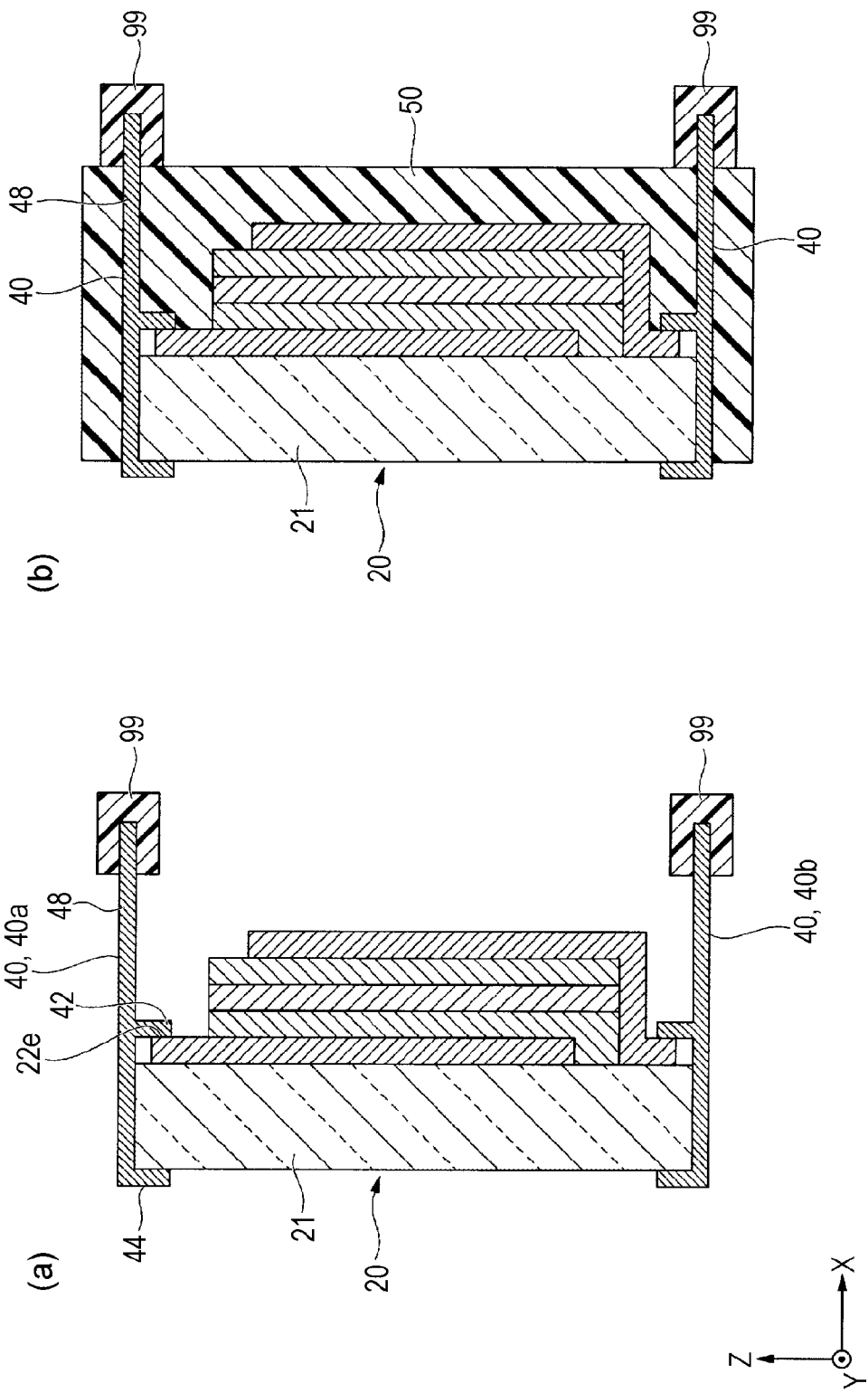
FIG. 10 includes fourth explanatory views for describing the method for fabricating the electrochromic mirror according to the first embodiment, which are cross-sectional views corresponding to the portion taken along the line A-A of FIG. 2, wherein FIG. 10($a$) is a cross-sectional view illustrating a state before film formation and FIG. 10($b$) is a cross-sectional view illustrating a state after film formation.

After that, the reflecting electrode film 26 is formed as illustrated in FIG. 9. In particular, the transparent substrate 21 is set to a third film formation jig 93 as illustrated in FIG. 9(a). The third film formation jig 93 includes an opening portion 93w that exposes the +X side of the transparent substrate 21. A Z-direction center portion 93c of the opening portion 93w is disposed at the −Z side of the center portion 21c in the Z-direction of the transparent substrate 21. Then, the third film formation jig 93 is masked, and the reflecting electrode film 26 is formed at the +X side of transparent substrate 21 through the opening portion 93w as illustrated in FIG. 9(b). This forms the reflecting electrode film 26 with displacing a center portion 26c in the Z-direction of the reflecting electrode film 26 from the center portion 21c in the Z-direction of the transparent substrate 21 to the −Z side.

As described above, the EC mirror main body 20 is completed.

The first film formation jig 91, the second film formation jig 92, and the third film formation jig 93, the opening portions of which are displaced from one another, can be sequentially used to form the transparent electrode film 22, the EC layer 30, and the reflecting electrode film 26 with being sequentially displaced from one another in the Z-direction.

Subsequently, the power feeding terminal 40 is coupled to the EC mirror main body 20 as illustrated in FIG. 10(a). In particular, the coupling portion 46 of the power feeding terminal for transparent electrode 40a is disposed along the side surface of the transparent substrate 21. The electrode contacting portion 42 is folded to contact the +X surface of the transparent electrode film protruding portion 22e. The substrate contacting portion 44 is folded to contact the −X surface of the transparent substrate 21. The electrode contacting portion 42 and the substrate contacting portion 44 are crimped toward each other. This mechanically and electrically couples the power feeding terminal for transparent electrode 40a to the EC mirror main body 20. Note that, the distal ends of the post portions 48 in the +X-direction are covered with caps 99. The same applies to the power feeding terminal for reflecting electrode 40b.

Next, the EC mirror main body 20 is coated with the ion-insulating material 50 as illustrated in FIG. 10(b). In particular, the ion-insulating material 50 is formed on the surface of the EC mirror main body 20, to which the power feeding terminal 40 is mounted, with hiding the −X surface of the transparent substrate 21. At this time, the distal end of the post portions 48 of the power feeding terminals 40 is covered with the caps 99, and accordingly the ion-insulating material 50 is not attached to the distal ends of the post portions 48.

After that, the caps 99 are removed, and then the EC mirror main body 20 is secured in the minor holder 11 illustrated in FIG. 3 to complete the EC minor 10.

As described in detail above, the EC mirror 10 according to the first embodiment has a configuration in which the transparent electrode film 22, the EC layer 30 that emits a color light with an applied voltage, and the reflecting electrode film 26 are sequentially laminated on the +X surface of the transparent substrate 21. The protruding portion 22e of the transparent electrode film 22 is disposed at the +Z side of the EC layer 30, while the protruding portion 26e of the reflecting electrode film 26 is formed at the −Z side of the EC layer 30 when being viewed from the +X-direction. The whole overlapping region 24 where the transparent electrode film 22 and the reflecting electrode film 26 overlap each other is included within the EC layer 30 when being viewed from the +X-direction.

With this configuration, the EC minor can be driven by coupling power feeding terminals to the transparent electrode film protruding portion 22e and the reflecting electrode film protruding portion 26e and applying a voltage to the EC layer. Since the whole overlapping region 24 is included within the EC layer 30, the side surface of the EC layer 30 does not overlap both of the transparent electrode film 22 and the reflecting electrode film 26 when being viewed from the +X-direction. This can prevent the material of the reflecting electrode film 26 from reaching the transparent electrode film 22 via the side surfaces of the EC layer 30 when the reflecting electrode film 26 (particularly, the reflecting electrode film protruding portion 26e) is formed. Accordingly, the insulating properties between the transparent electrode film 22 and the reflecting electrode film 26 can be ensured.

Second Embodiment

FIG. 11 is an explanatory view illustrating an EC mirror 210 according to a second embodiment, and is a cross-sectional view corresponding to the portion taken along the line A-A of FIG. 2. In the EC mirror 10 according to the first embodiment, which is illustrated in FIG. 3, the protruding portion 22e of the transparent electrode film 22 is disposed at the +Z side of the EC layer 30 while the protruding portion 26e of the reflecting electrode film 26 is disposed at the −Z side of the EC layer 30. The EC mirror 210 according to the second embodiment, which is illustrated in FIG. 11, is different from the EC mirror 10 in that the whole EC layer 30 is included within the transparent electrode film and the whole reflecting electrode film 26 is included within the EC layer 30. In the following, a detailed description of the points similar to the first embodiment will be omitted.

As illustrated in FIG. 11, the EC mirror 210 has a configuration in which the transparent electrode film 22, the EC layer 30, and the reflecting electrode film 26 are sequentially laminated on the +X surface of the transparent substrate 21. The whole EC layer 30 is included within the transparent electrode film 22 and the whole reflecting electrode film 26 is included within the EC layer 30 when being viewed from the +X-direction. This prevents the transparent electrode film 22 and the reflecting electrode film 26 from overlapping each other, and electrically decouples them by the EC layer 30.

A transparent electrode coupling film 23 is disposed with being aligned with the reflecting electrode film 6 on the +X surface of the EC layer 30. The transparent electrode coupling film 23 is coupled to the +X surface of the transparent electrode film 22 via the side surface of the EC layer 30. The transparent electrode coupling film 23 is made of a metallic material having conductivity (e.g. aluminum (Al)). Note that the reflecting electrode film 26 and the transparent electrode coupling film 23 are preferably made of the same material. In this case, the reflecting electrode film 26 and the transparent electrode coupling film 23 can be simultaneously formed by integrally forming both films and separating them by a groove portion 23s, which is formed with, for example, laser etching.

A panel member 60 is disposed on the +X side of the reflecting electrode film 26 and the transparent electrode coupling film 23. The panel member 60 is made of a resin material (e.g. polyethylene). The panel member 60 protects the +X side of the EC mirror main body 20.

A pair of through electrodes 63 and 66 is disposed in the panel member 60, and the pair of through electrodes 63 and 66 passes through the panel member 60 in the thickness direction. The through electrode 66 is coupled to the reflecting electrode film 26 via a conductive adhesive 68. The through electrode 63 is coupled to the transparent electrode coupling film 23 via another conductive adhesive 68. This can feed power to the EC mirror main body 20 via the through electrodes 63 and 66 that are exposed at the +X surface of the panel member 60.

The peripheral edge portion between the transparent substrate 21 and the panel member 60 is covered with a sealing material 70. The sealing material 70 is made of a resin material (e.g. epoxy resin). The sealing material 70 protects the peripheral edge portion of the EC mirror main body 20.

As described in detail above, the EC mirror 210 according to the second embodiment has a configuration in which the whole EC layer 30 is included within the transparent electrode film 22 and the whole reflecting electrode film 26 is included within the EC layer 30 when being viewed from the +X-direction. With this configuration, the whole reflecting electrode film 26 is included within the EC layer 30. This can prevent the material of the reflecting electrode film 26 from reaching the side surface of the EC layer 30 when the reflecting electrode film 26 is formed. Accordingly, the insulating properties between the transparent electrode film 22 and the reflecting electrode film 26 can be ensured.

The technical scope of the present invention is not limited to the above-described embodiments, and includes various embodiments modified from the above-described embodiments without departing the spirit of this disclosure. Namely, the configurations of the above-described embodiments are only examples, and may be modified as necessary.

For example, in the first embodiment illustrated in FIG. 3, the transparent electrode film protruding portion 22e is formed in the +Z direction of the EC layer 30 while the reflecting electrode film protruding portion 26e is formed in the −Z direction of the EC layer 30. However, the transparent electrode film protruding portion 22e and the reflecting electrode film protruding portion 26e are not necessarily directed in 180 degree opposite direction with respect to each other, but may be directed in different directions as viewed from the EC layer 30.

In addition, in the first embodiment, the outline of the EC layer 30 is larger than the outline of the transparent electrode film 22 and the outline of the reflecting electrode film 26. However, the former may be formed as the same shape as the latter, or the former may be formed smaller than the latter.

In addition, in the first embodiment, the transparent electrode film 22, the EC layer 30, and the reflecting electrode film 26 are disposed with being sequentially displaced from one another in the Z-direction that is the short side direction. However, they may be disposed with being sequentially displaced from one another in the Y-direction that is the long side direction.

Also, in the first embodiment, the contact area between the transparent electrode film protruding portion 22e and the power feeding terminal for transparent electrode 40a is larger than the contact area between the reflecting electrode film protruding portion 26e and the power feeding terminal for reflecting electrode 40b. However, these contact area may be the same. In this case, the power feeding terminals may be the same.

DESCRIPTION OF REFERENCE SIGNS

10 EC mirror (electrochromic mirror)
11 Mirror holder
20 EC mirror main body
21 Transparent substrate
22 Transparent electrode film
22e Transparent electrode film protruding portion
24 Overlapping region
26 Reflecting electrode film
26e Reflecting electrode film protruding portion
30 EC layer (electrochromic layer)
40a Power feeding terminal for transparent electrode
40b Power feeding terminal for reflecting electrode

The invention claimed is:

1. An electrochromic mirror comprising:
   a transparent electrode film;
   an electrochromic layer that emits a color light upon application of a voltage;
   a reflecting electrode film;
   a protruding portion of the transparent electrode film formed in a first direction of the electrochromic layer when being viewed from a normal direction of a transparent substrate; and
   a protruding portion of the reflecting electrode film formed in a second direction of the electrochromic layer when being viewed from the normal direction of the transparent substrate,
   the transparent electrode film, the electrochromic layer, and the reflecting electrode film being sequentially laminated on a first surface of the transparent substrate, wherein
   a whole overlapping region where the transparent electrode film and the reflecting electrode film overlap each other is included within the electrochromic layer when being viewed from the normal direction, and
   an outline of the electrochromic layer is larger than an outline of the transparent electrode film and an outline of the reflecting electrode film when being viewed from the normal direction.

2. The electrochromic mirror according to claim 1, wherein
   the transparent electrode film, the electrochromic layer, and the reflecting electrode film have a shape with a long side direction and a short side direction, and are disposed with being sequentially displaced from one another in the short side direction when being viewed from the normal direction, and
   a power feeding terminal for transparent electrode is coupled to the protruding portion of the transparent electrode film in the long side direction and a power feeding terminal for reflecting electrode is coupled to the protruding portion of the reflecting electrode film in the long side direction when being viewed from the normal direction.

3. The electrochromic mirror according to claim 2,
   a contact area between the protruding portion of the transparent electrode film and the power feeding terminal for transparent electrode is larger than a contact area between the protruding portion of the reflecting electrode film and the power feeding terminal for reflecting electrode.

4. The electrochromic mirror according to claim 3, further comprising
   a mirror holder that holds the transparent substrate, wherein
   the mirror holder covers a peripheral edge portion of a second surface of the transparent substrate, the second surface being a backside surface of the first surface.

5. The electrochromic mirror according to claim 2, further comprising
   a mirror holder that holds the transparent substrate, wherein
   the mirror holder covers a peripheral edge portion of a second surface of the transparent substrate, the second surface being a backside surface of the first surface.

6. The electrochromic mirror according to claim 1, wherein
   the transparent electrode film, the electrochromic layer, and the reflecting electrode film have a shape with a long side direction and a short side direction, and are disposed with being sequentially displaced from one another in the short side direction when being viewed from the normal direction, and a power feeding terminal for transparent electrode is coupled to the protruding portion of the transparent electrode film in the long side direction and a power feeding terminal for reflecting electrode is coupled to the protruding portion of the reflecting electrode film in the long side direction when being viewed from the normal direction.

7. The electrochromic mirror according to claim 6, a contact area between the protruding portion of the transparent electrode film and the power feeding terminal for transparent electrode is larger than a contact area between the protruding portion of the reflecting electrode film and the power feeding terminal for reflecting electrode.

8. The electrochromic mirror according to claim 7, further comprising a mirror holder that holds the transparent substrate, wherein the mirror holder covers a peripheral edge portion of a second surface of the transparent substrate, the second surface being a backside surface of the first surface.

9. The electrochromic mirror according to claim 6, further comprising a mirror holder that holds the transparent substrate, wherein the mirror holder covers a peripheral edge portion of a second surface of the transparent substrate, the second surface being a backside surface of the first surface.

10. The electrochromic mirror according to claim 1, further comprising a mirror holder that holds the transparent substrate, wherein the mirror holder covers a peripheral edge portion of a second surface of the transparent substrate, the second surface being a backside surface of the first surface.

11. The electrochromic mirror according to claim 1, further comprising a mirror holder that holds the transparent substrate, wherein the mirror holder covers a peripheral edge portion of a second surface of the transparent substrate, the second surface being a backside surface of the first surface.

* * * * *